US005572650A

United States Patent [19]

Antis et al.

[11] Patent Number: 5,572,650
[45] Date of Patent: Nov. 5, 1996

[54] METHOD AND APPARATUS FOR DISPLAYING STRUCTURES AND RELATIONSHIPS OF A RELATIONAL DATABASE

[75] Inventors: Jacqueline M. Antis, Palos Park; Stephen G. Eick; John D. Pyrce, both of Naperville, all of Ill.

[73] Assignee: Lucent Technologies Inc., Murray Hill, N.J.

[21] Appl. No.: 269,221

[22] Filed: Jun. 30, 1994

[51] Int. Cl.⁶ ........................................ G06F 15/00
[52] U.S. Cl. ........................................ 395/356
[58] Field of Search ........................ 395/155, 161, 395/160, 157, 158; 345/119, 120

[56] References Cited

U.S. PATENT DOCUMENTS 5,430,870  7/1995  Stanton et al. ................. 395/600
5,442,690  8/1995  Naziz et al. ..................... 379/207

OTHER PUBLICATIONS

P. P. Chen, "The Entity Relationship Model: Toward a Unified View of Data", vol. 1, No. 1, Mar. 1976, pp. 9–37.
J. Mackinlay, "Automating The Design Of Graphical Presentations Of Relational Information", *ACM Transactions on Graphics*, vol. 5, No. 2, 1986, pp. 110–141.

M. Gemis et al., "GOOD: A Graph–Oriented Object Database System", in P. Buneman and S. Jajodia ed., vol. 22, Issue 2, Jun. 1993, pp. 505–508.
D. Harel, "On Visual Formalisms", *Communications of the ACM*, vol. 31, No. 5, 1988, pp. 514–530.
M. P. Consens et al., "Hy⁺: A Hygraph–based Query and Visualization System", Computer Systems Research Institute, University of Toronto, pp. 511–516, 5–1993.

*Primary Examiner*—Phu K. Nguyen
*Attorney, Agent, or Firm*—Jack R. Penrod

[57] ABSTRACT

A method and apparatus for visually displaying structural characteristics of a large database for visualizing areas where new developments may be added, or finding places where old developments may need to be re-structured or replaced. This method and apparatus shows the entire structure without showing the entire semantics, which would be too much information. Semantic information is available in other windows that can be opened after the focus of the analysis is selected. After selection, the semantic information is displayed in a focused manner also. This is accomplished by referencing the selected relation to the location of that relation in the database specification or in the relational data base management system (RDBM) application code.

15 Claims, 12 Drawing Sheets

Microfiche Appendix Included
(3 Microfiche, 255 Pages)

/BU3/JME/SEEDATA/SEEDATABASE/V9.0/PRL/POPRULES/RLls_lnk.R

PRL VERSION: 5.0:
RELATION:
    RLls_lnk
FULLNAME:
    LINK SET LINK
DESCRIPTION:
    THIS RELATION CONSISTS OF INFORMATION ON A PARTICULAR LINK.
    THE PURPOSE OF THIS RELATION IS TO PROVIDE INFORMATION ON AN
    INDIVIDUAL LINK BASIS. THE INFORMATION CONSISTS OF THE LINK'S SDL
    AND ST PORTS, AND THE SM THAT THE SDL PORT IS FOUND IN.

RC-ODA-RULES:
    NONE.

RETROFIT-RULES:
    NONE.

DEFAULT-RULES:
    default.lnkgrp = 0;
    default.master = DBNO;
    default.dfinum = 0;

PATTERN:

*Window title:* RLls_lnk

Controls: 14 | ☐ EXPAND ☐ UNUSED | ☐ PAM ☐ ASM ☐ ASM2K ☐ GLOBAL

ASM ccs/CCstrmspi/CCs7text.bp

Left column (807): ama, as, au, ccs, cm, da, db, dg, hm, nm, oa, os, pc, prl, rc, rta, si, sm, smim, tm, trc, up, ut, wl prl sub-entries: PRLrlak (FAls cocp.bp, FLls grp.bp), PRLrlbg (FAlgrpmem.bp, FAsdl st.bp, RLlgrpmem.bp, RLsdl st.bp)

rc sub-entries: RCxccsmp / RCxccsmp.bp, RExtrafmp / RXxtrafmp.bp, RCxutil / RCppm.bp Middle column (805): ama, as, au, ccs, cm, cra, da, db, dg, dn, fc, fp, hm, nm, oa, pc, ps, rta, si, sm, smim, tm, trc, up, ut ccs sub-entries: ASxms ss7 / Sxss7text.bp, AUxcit7 / AUxcit7.bp, CCamstrm / CCamstrm.bp, CCmaint / CCmaint_7m.bp, CCmcc / CCmctext.bp, CCstrmcsc / CCstrmcsc.bp, CCstrmspi / CCs7text.bp (803), CCstrmspo / CCstrmspo.bp, CCstrmtrg / CCstrmtrg.bp pc: PCslm / JPCslm.bp tm: TMps dlt / TMps dlt.bp, TMslmc / TMslmc.bp, TMslmtp / Tmslmtp.bp Labels: 801, 803, 805, 807, 809

METHOD AND APPARATUS FOR DISPLAYING STRUCTURES AND RELATIONSHIPS OF A RELATIONAL DATABASE

MICROFICHE APPENDIX

A microfiche appendix containing a computer program listing is included. The microfiche appendix consists of three sheets of microfilm with two hundred fifty-five total frames, including test targets and title pages, appearing thereon.

TECHNICAL FIELD

The invention concerns graphical displays for visualizing useful characteristics of large databases, in general, and graphical displays for visualizing structures and relationships within large databases, in particular.

DESCRIPTION OF THE PROBLEM

Each relational database consists of data arranged in one or more relations. Each relation consists of one or more attributes and one or more tuples. For two dimensional relational databases, the relations can be represented by tables, the attributes by columns of the tables and the tuples by rows of the tables. Large databases typically have a straightforward structure that is explicitly defined. However, even a database that is well defined explicitly may still have a high degree of complexity because of the amount of data it stores, the number of relations it contains, the number of relationships between relations or the mapping between displayed views and physical storage. This is especially true of so called "legacy" databases that have existed and evolved for a decade or more.

In addition to the explicitly defined structure, each database has an implicitly defined structure. Implicit structure occurs when the same data item or characteristic, such as an attribute or tuple, appears in two or more separate places. This implicit structure is a type of meta data that is very useful for defining objects or simply accessing data in a way different than the way contemplated in the explicit definition. An association exists implicitly where data of the same type, or domain, occurs in separate relations. An example of an association between two relations is one in which a non-key attribute in one relation is a key attribute in another relation. Associations are connections where relational joins may be made.

Collections of relations are often used to define objects. However, such collections are rarely explicitly defined. In such cases, implicit associations between relations many times are used to define collections of relations, which in turn are used to define objects.

Finding the implicit structures and associations within a large database with known techniques is a challenging task for many reasons. First, the total size and complexity of the database may make it difficult to understand. Second, the evolution of the database, i.e. changes, in response to changing requirements may degrade both its implicit and explicit structure. Third, the usual technique for tracking implicit structures in relational databases, Entity Relationship Diagrams or ERDs, is inefficient when used on small databases and does not easily scale up for use on large databases. An ERD explicitly defines entities, e.g. objects, as needed, and the relationships and associations between the entities. The ERD graphically represents relationships and associations as a network. Both the entities and the associations are given names. Thus, the ERD techniques adds what amounts to an additional layer of semantics and definitions to a database: a complex layer that must be maintained along with the database, thereby adding more work to each change to the relational database. Even with the extra work, for large databases the graphical representations typically are too busy and cluttered to be helpful to a software engineer trying to visualize a large database.

Another known relational database visualization technique is a graphic automated presentation tool (APT) by Mackinlay. APT designs static, two dimensional presentations of relational information. To use APT, a formal characterization of the semantic relational information and precision visual presentation requirements are necessary. APT is an automated system that has a prescriptive mechanism for designing each two dimensional graphic presentation with some user input (usually of less than the entire database). However, unless the user knows exactly where he or she should be looking and can formally characterize the semantic relational information at that point, the resulting static two dimensional graphic from the APT presentation system will not be very helpful for analyzing large databases. A lot of trial and error will be needed unless the user is extremely lucky.

Therefore, there is a long felt need in the art for a method and apparatus for displaying characteristics of a database without semantic information such that explicit and implicit data structures can be readily observed to facilitate use, development and maintenance of large databases.

Solution

Briefly stated, the aforementioned problem is solved and an improvement over the known techniques by providing a method and apparatus for displaying statistics and characteristics of an entire relational database in one overall view without any semantic information to clutter the display and confuse the viewer. The semantic information, which is purposefully omitted from the overall view, is provided in additional views that are interactively linked to the overall view and to each other.

According to another aspect of the invention, the aforementioned problem is solved and an improvement over the known techniques is achieved by providing a method for displaying information about a relational database. The method includes a number of steps. Initially, each relation of a plurality of relations in the relational database is identified. Next, for each relation, a respective number of structural characteristics contained in the relation is determined. Also, for each relation, a key structural characteristic for accessing that relation is determined. The plurality of relations is then categorized according to their key structural characteristics. Next, the plurality of relations is visually presented in categories according to their key structural characteristics with each relation being represented by a respective bar whose length is representative of the number of the structural characteristics contained therein.

DETAILED DESCRIPTION

Figure 1:
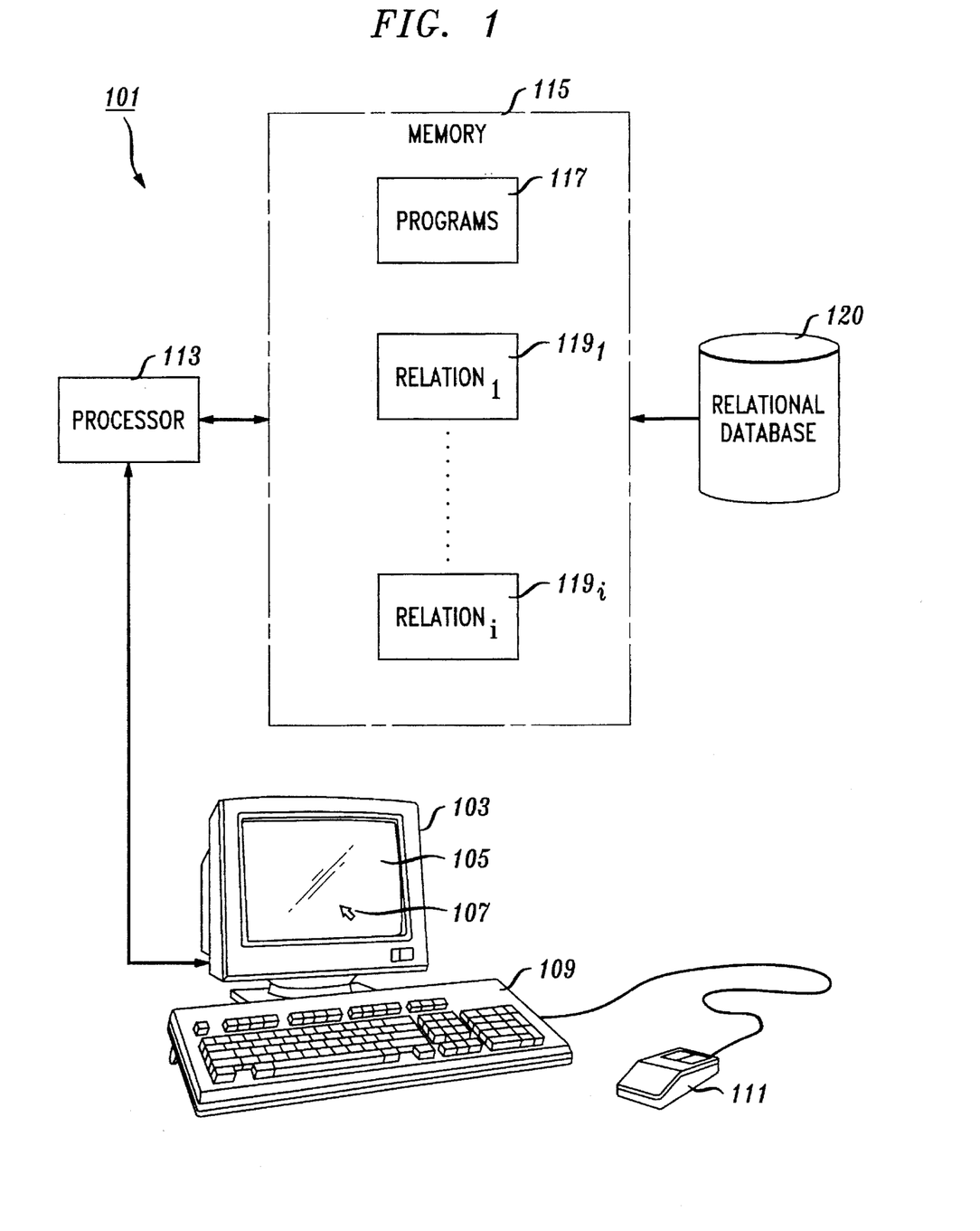
FIG. 1 is a block diagram of a computer system for analyzing a relational database according to the present invention.

Referring now to FIG. 1, a block diagram of an example of a relational database analysis system 101 is shown. The system 101 includes terminal 103, which provides output to and receives input from a user of the system, processor 113, which performs the actual analysis operations, memory system 115, which contains programs 117 executed by processor 113 and relations $119_1$-$119_j$, each of which contains a respective set of attributes and tuples. The system 101 also has a mass storage system 120 for storing the relational database, its specifications and the relational database management system or systems (RDBMS) used to query, process and extract information from the relational database. The RDBMS is one of the programs 117.

In more detail, terminal 103 includes a display screen 105, upon which processor 113 displays information for the user. Display screen 105 also includes a cursor 107, which specifies a location in display 105 and may be moved under control of either keyboard 109 or mouse 111. The operator controls the operation of system 101 by inputs from keyboard 109 and/or mouse 111. Processor 113 may be any kind of processor, from a personal computer through a workstation or even a super computer. Memory system 115 includes any data accessible to system 101, and may thus include random-access memory and/or read-only memory. Connected to memory system 115 is mass storage system 120 from which data is read into memory system 115 to make such data more accessible, or into which data is stored, e.g. for the long term. Mass storage system 120 may include magnetic disk and/or optical disk.

When employing computer system 101 to analyze a large relational database, the user may use keyboard 109 or mouse 111 as input devices. Processor 113 executes programs 117 as required to perform the analysis on the relational database and graphically displays the results on display screen 105. The user can then use keyboard 109 and/or mouse 111 to interactively examine the results in more detail, or call up other linked displays to obtain more information.

The preferred embodiment of system 101 runs under the UNIX operating system (UNIX is a registered trademark of UNIX Systems Laboratories) using a workstation, such as a SUN workstation, manufactured by SUN Microsystems, using an X Windows System for workstation applications. (X-Windows is a trademark of Massachusetts Institute of Technology).

Figure 2:
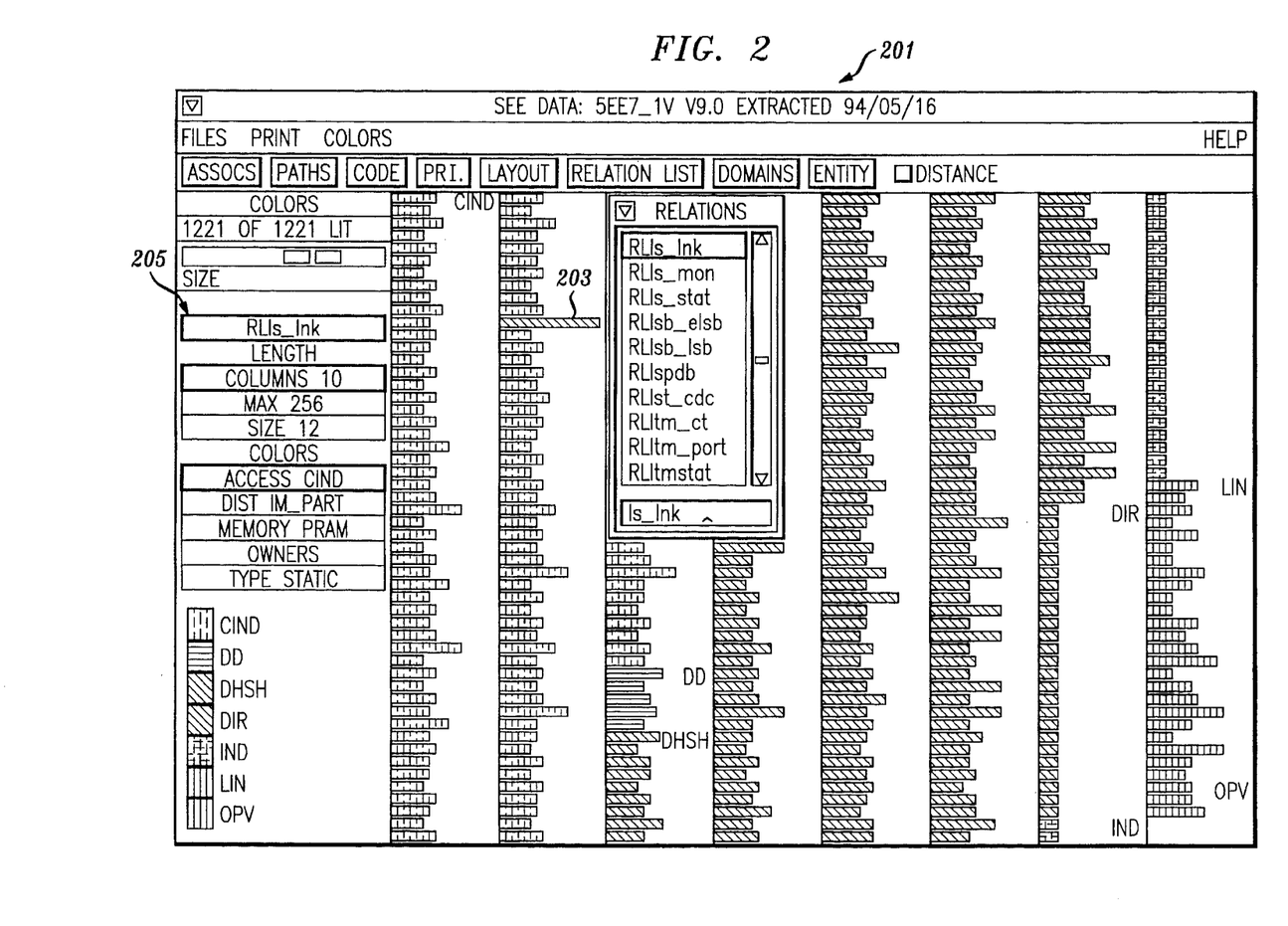
FIG. 2 is a representation of a typical display of an over view according to the present invention.

Referring now to FIGS. 1 and 2, a display 201 is shown on display screen 105. Display 201 is an over view, which is the highest view level of the large relational database. The large relational database may contain over 1,000 relations comprising over 10,000 attributes. Display 201 may display up to 1,200 relations shown in multiple columns. Each relation is represented by a bar. The size of the display screen 105 and the graphic resolution of the computer system 101 determine the smallest relational bar and the largest database that may be displayed in its entirety. Preferably, all the relations of the entire database could be represented in the over view. The presentation of all the relations on a single screen gives the user a unifying perspective of the database that allows software personnel to understand how a single relation fits into the structure of the whole database. However, if the graphic limit of computer system 101 and display screen 105 is exceeded, some scrolling of the relations could be used without degrading the overall perspective.

The relations of display 201 are arranged according to their structural characteristics under control of the user. In display 201 the relations are displayed alphanumerically from 0-9 and from A-Z according to the designation of their access. Since there are no relations having access methods beginning with a numeric character or letters A-B, the first category of relations is a category having access CIND, as shown by the designation CIND next to the first relation shown in the left most column. All of the relations having CIND are listed in alphanumeric order from the upper left of the left most column to over half way down the third column from the left. The remaining columns have similarly organized listings for relations having accesses designated DD, DHSH, DIR, IND, LIN and OPV.

To assist the user in visualizing the commonalty among relations that have the same access, the relations in each category may be commonly colored, such as violet for relations with CIND accesses. Relations having different accesses may have different coloring, such as accesses DD, DHSH, DIR, IND, LIN and OPV having blue, emerald green, lime green, yellow, light red and dark red respectively. If color was not available or desired, different shades of gray and patterns could be used instead.

Each relation in FIG. 2 is represented by a bar whose length is dependent upon a statistic of the relation, for example the number of attributes, tuples, or bytes in a tuple in the relation. When a relation bar is touched by the cursor 107 (see FIG. 1) its color is highlighted to a color or gray shade that contrasts with the adjacent relation bars, such as relation bar 203. The highlighted color or shade is an indication that this particular relation has been selected for closer examination. Upon selection, the name or designation of the selected relation appears in a designation box 205. The selected relation bar 203 corresponds to the relation designated RLls_lnk. Immediately below the designation box 205 are three boxes that provide statistics for the number of columns (i.e. attributes) in the selected relation, which for RLls_lnk is shown to be 10; the maximum number of tuples, which is shown to be 256; and the size of each tuple, which is shown to be 12 bytes.

Across the top of display 201 are a number of activity buttons which maybe activated by the cursor to provide additional information about the selected relation, in this case relation RLls_lnk. The buttons are labeled: Assocs (abbreviation for Associations), Paths, Code, PRL (abbreviation for Population Rule Language, commonly referred to as the Specification View), Layout, Relations List, Domains, Entity, and Distance. Each of these buttons, except Distance, may be used to open another window on the screen 105 (see FIG. 1) which displays another view of the relational database under analysis.

Figure 3:
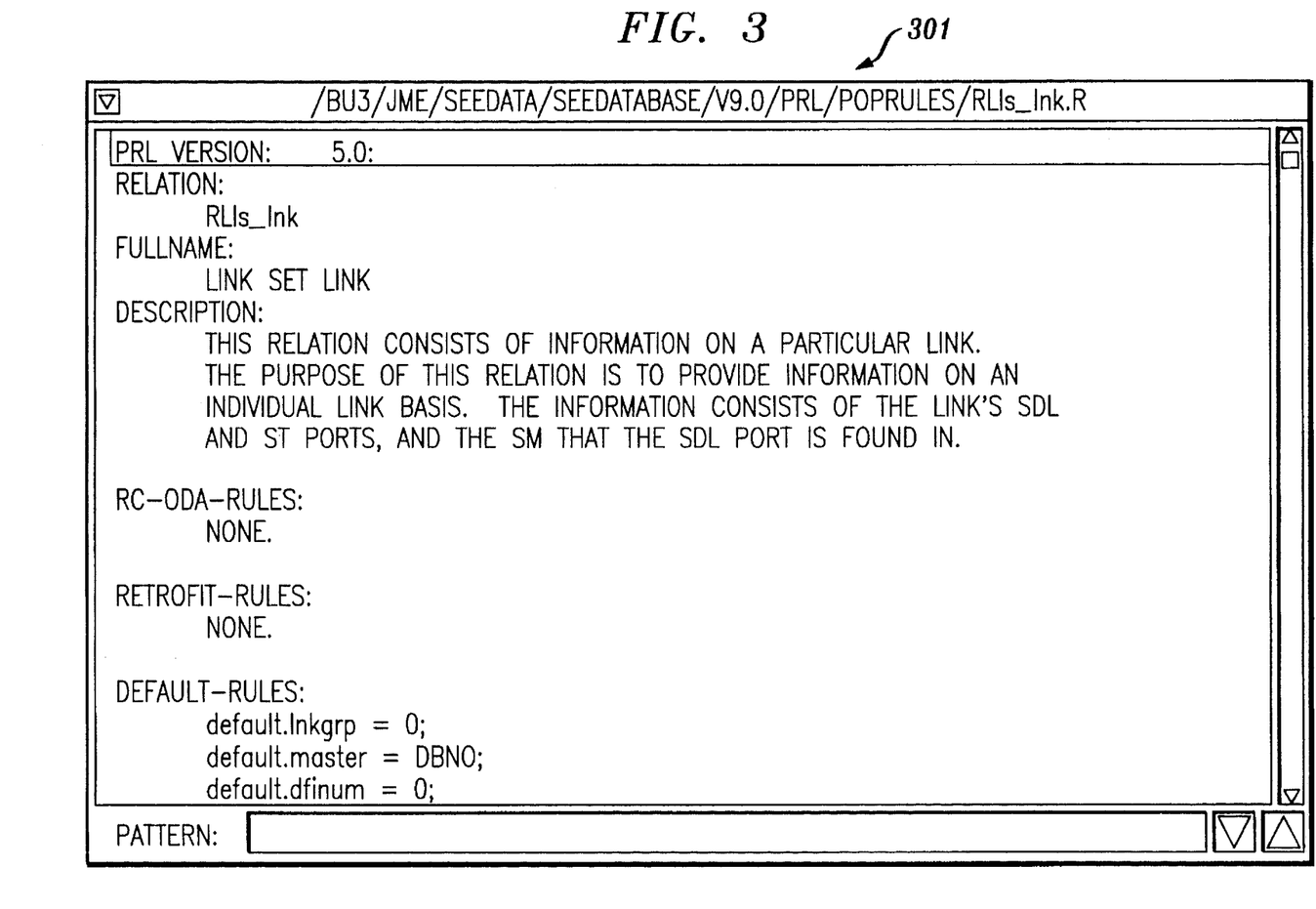
FIG. 3 is a representation of a typical display of a specification view according to the present invention.

Referring now to FIG. 3, a display 301 is shown on display screen 105 that is called the specification view. In the specification view the actual specification(s) of the database in the database description language or languages that are understood by the RDBMS may be directly viewed. The method and apparatus according to the present invention preprocesses existing explicit descriptions of the relations in the database and the RDBMS application source code, including predefined queries of the database, into a reference file used by the display portion of the database analysis system. The specification view accesses this reference file when activated. When display 301, the specification view is activated while a selection of a relation in display 201 is still active, then the specification view opens up to the selected relation, in this example RLls_lnk. This allows the descriptions of relations and the source code form of queries to be viewed directly in the context of the selected relation. In the specification view, queries shown declaring associations between relations in the query have that portion of the display 301 highlighted by a contrasting color or shade of gray.

The display 301 is typically less than a full screen in size in order to provide interaction with one or more other displays, but may be expanded to occupy the entire display screen if desired. The specification view is interactively linked to the over view such that a change of the selected relation in one will cause an automatic and nearly immediate change to the new selected relation in the other.

Figure 4:
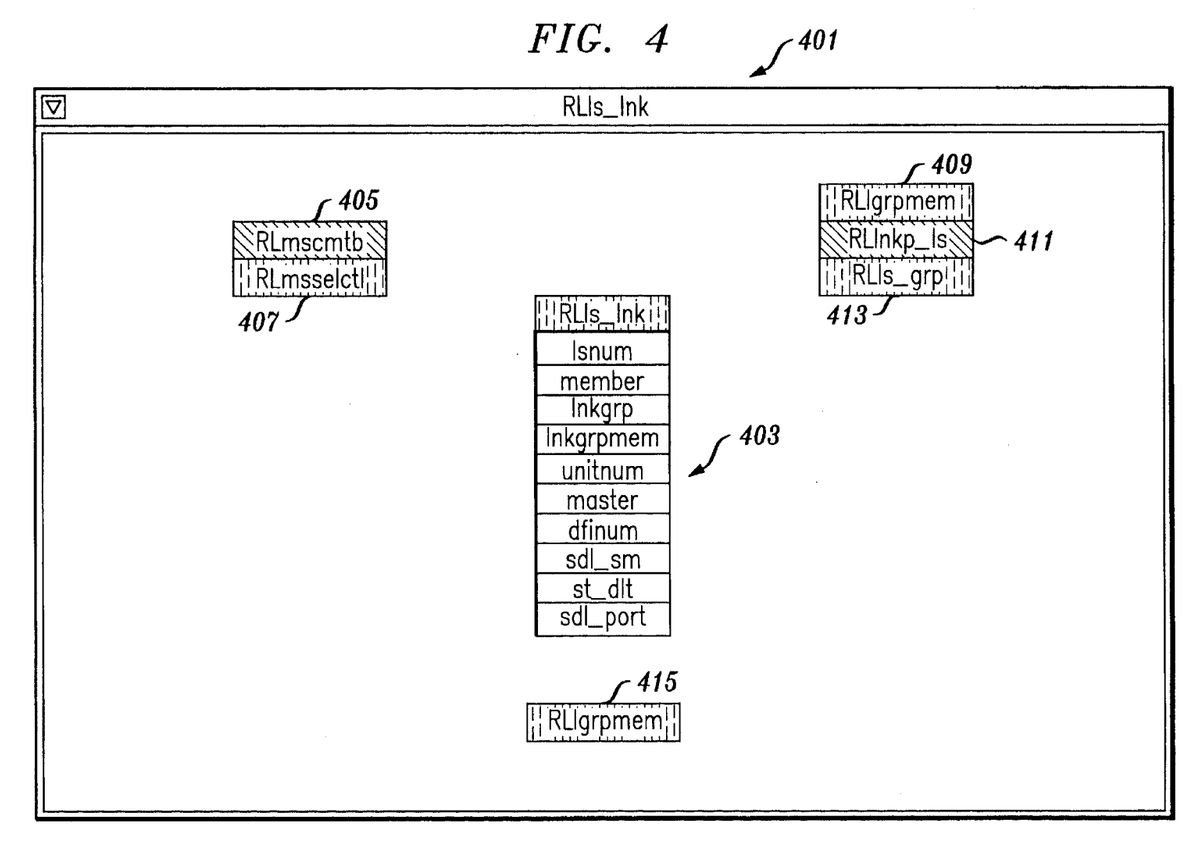
FIG. 4 is a representation of a typical display of an associations view according to the present invention.

Referring now to FIG. 4, display 401 is an associations view. The associations view shows the associations between the selected relation and other relations of the database through queries and other mechanisms supported by the RDBMS. This view is used to discover associations between relations. Shown in the associations view are the selected relation 403, RLls_lnk; the associated relations defined in the database specifications; and the type of association between the selected relation and the other relations.

Figure 5:
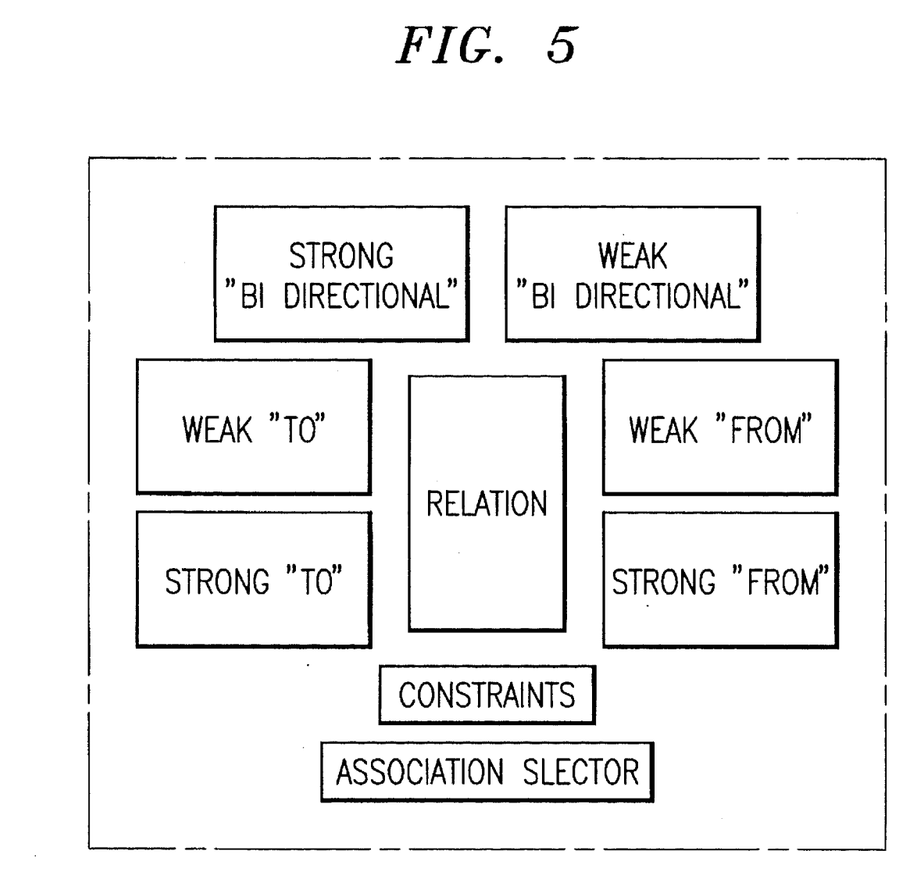
FIG. 5 is a block diagram showing the locational encoding of the information displayed in the association view shown in FIG. 4.

The selected relation 403 is located in the center of display 401. In this example, it has ten attributes, lsnum, member, lnkgrp, lnkgrpmem, unitnum, master, dfinum, sdl_sm, st_dlt, and sdl_port. The associated relations 405, 407, 409, 411, 413 and 415 are located around the selected relation 403. The location of each the relations 405–415 visually indicates to the user the type of association it has with the selected relation 403. FIG. 5 shows an example of a directional, positional encoding scheme used in display 401, although alternative positional schemes could be used as long as the user understands the encoding scheme. A strong association means that the association may be used as an access path to directly find a tuple in the associated relation. A tuple may be directly accessed if the associated relation provides a complete key attribute to the target relation. A strong association contains a complete key. A weak association contains only an incomplete key attribute and cannot be directly used to access a tuple. Weak associations may be used if the user understands how to complete the incomplete key attribute, or if it can be used for a sequential search. Constraints, such as relation 415, are limitations and are shown for information only since they do not provide accesses. To further enhance the visual transfer of information to the user, each of the relations in the relational view is colored or gray shaded according to a characteristic, such as its respective access, just as in over view display 201.

Figure 6:
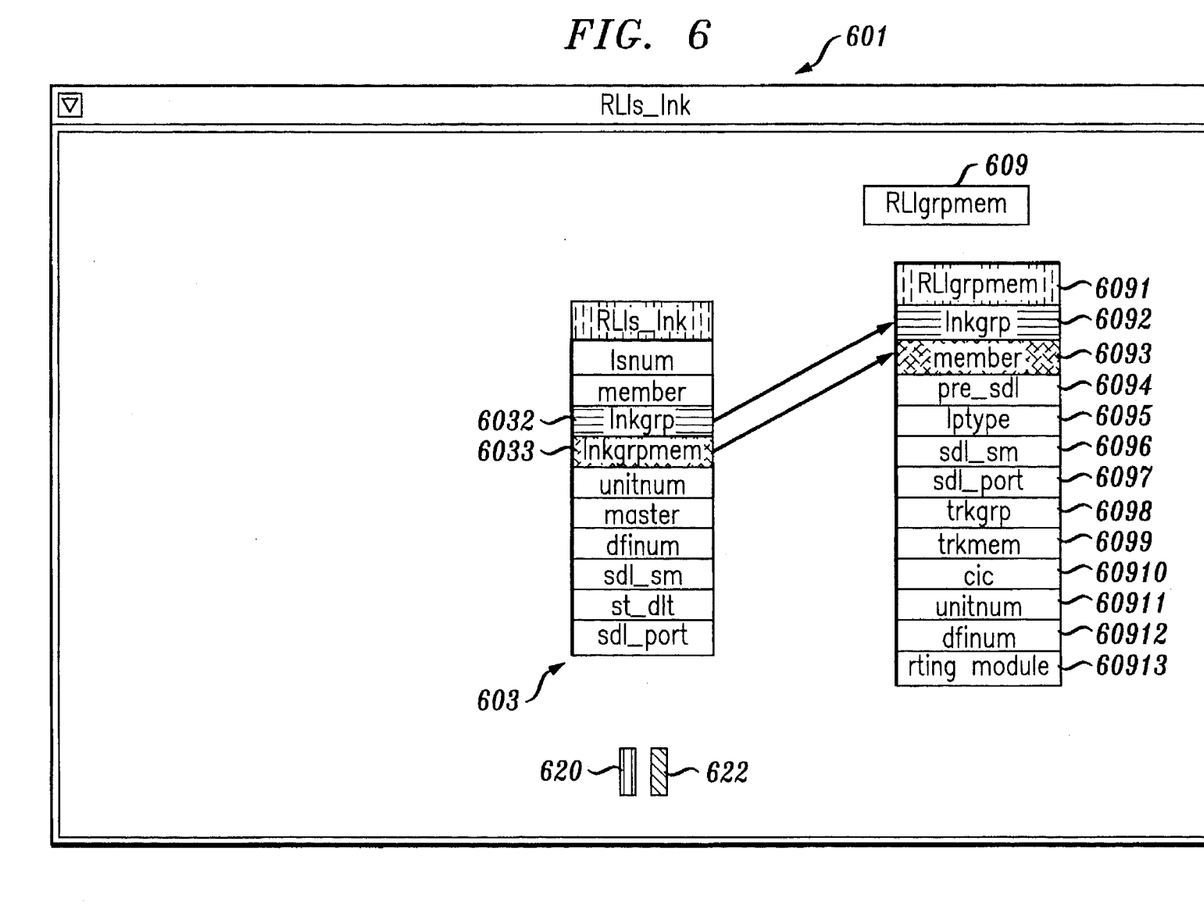
FIG. 6 is a partial expansion of the associations view shown in FIG. 4

To analyze any of the associated relations 405–415 closer, a second selection can be made with the cursor (not shown) and if that is done, display 601 as shown in FIG. 6 appears. Referring now to FIGS. 4 and 6, the display of first selected relation 403 has changed slightly to the display of first selected relation 603. The display of second selected relation 409 has changed and expanded to the display of the second selected association 609 and its expanded form association 6091 with attributes 6092–60913. In this partially expanded associations view 601, attributes 6032 and 6033 are color or gray shade coordinated to show their linkage to attributes 6092 and 6093 respectively. This linkage is also shown by the arrows from 6032 and 6033 to 6092 and 6093. If an attribute is colored or shaded but there is no arrow connecting it to a linked attribute, the association involved concerns a constraint on the value of the attribute instead of a linkage to an attribute of an associated relation.

When display 601 is opened, an array of rectangles 620–622 are displayed along its bottom edge. These rectangles 620–622 represent the number queries or database specifications where this particular association is mentioned. Taken together, the rectangles 620–622 form an association selector. Pointing to any of the rectangles 620–622 in the association selector causes that association between the selected relations to be displayed in FIG. 6. Different attributes may be involved in different places where the association is mentioned, so the user is offered both for viewing.

If display 601 and display 301, the specification view, are open at the same time and use the same cursor (not shown), the two will be linked and the specification view will be scrolled to the location where the association between the two relations 603 and 609 is declared and that line will be highlighted. Each occurrence of the declaration of the association can be reviewed by touching the respective rectangles of the association selector.

If over view display 201 is active, a touch of any relation in display 401 or display 601 with a cursor will select the corresponding relation in over view display 201. When a relation is selected in over view display 201, its designation, characteristics and statistics are displayed there also.

Figure 7:
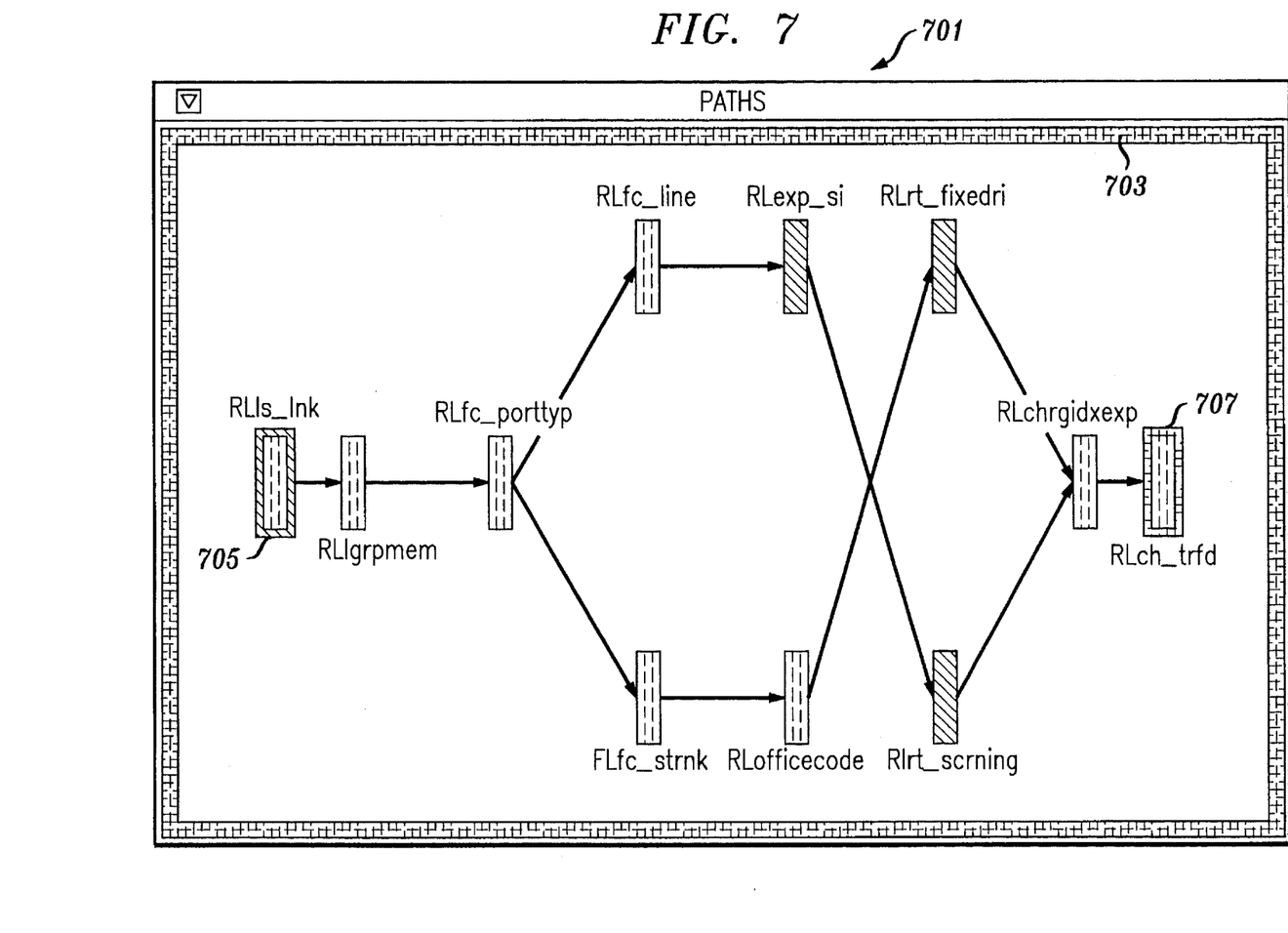
FIG. 7 is a representation of a typical display of a path view according to the present invention.

Referring now to FIG. 7, display 701, which may be either full screen, or one of many active windows displayed on the display screen 105, is a path view. The path view display 701 visually presents all of the shortest paths connecting any two selected relations. In this manner the present invention is a great improvement over techniques, such as ERD which shows many more paths and many more relations than necessary and thereby becomes needlessly confusing and complex. In FIG. 7, the shortness of a path is measured in terms of the number of joins, i.e. steps, required to traverse the path to the selected relation. Only strong paths based on steps made up of strong associations are shown in the path view. This means that each path shown may be used as an access without the further considerations required by weak associations. Since there is always at least one shortest path to any relation, FIG. 7 visually presents to the user an access path between any two relations.

Figure 11:
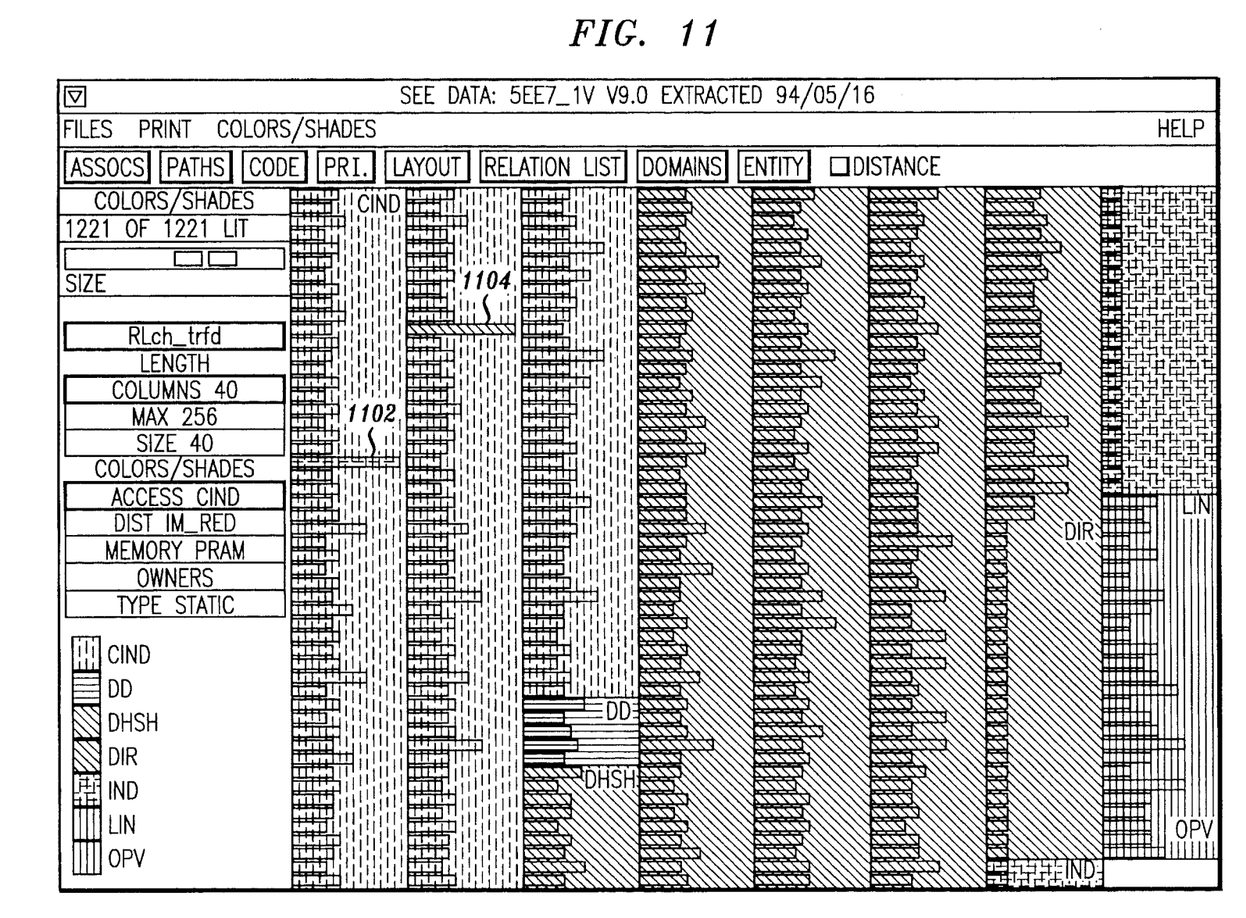
FIG. 11 is a representation of an over view as in FIG. 2, with two cursors active.

Access paths are shown as a directed network in the path view. When the path view is opened, two cursors 1102, 1104 are activated in the over view (shown in FIG. 11). The color(s) or gray shading(s) of these two cursors 1102, 1104 match the color(s) or gray shading(s) of the frame 703 of the path view window and also the color(s) or gray shade(s) of highlighted outlines around the two relations 705, 707 for which the shortest path or paths are shown. If the path view and the over view are both open at the same time, as either of the two cursors is moved in the over view, the corresponding relation changes in the path view, and the shortest paths between the two selected relations are displayed as directed networks immediately. Further, if the user points a cursor at a box representing a relation, such as box 705, in the path view, that box is highlighted, and the corresponding cursor in the over view moves to the corresponding relation bar, such as relation bar 203, and the relations bar is highlighted. Furthermore, the characteristics and statistics of this selected relation are shown in the over view. Normally, the coloring or shading of the relations in the path view will be the same as the coloring or shading of the relations in the over view; however, the coloring or shading of the relations in the over view may be changed so it is different from the path view in order to see which relations have those characteristics. By activating the Distance button on the over view display, relations in the over view may be colored according to how many steps from an originating relation there are in an access path.

The path view may be linked to the association view by the user by attaching both views to the same cursor. If this is accomplished, the relations in both views become linked. In such a case, touching a relation in the path view with the cursor highlights that relation in the association view as well as the path view. Clicking the mouse button on the highlighted relation in the path view is equivalent to clicking the mouse button on the same relation in the association view, i.e., the association is shown in an expanded form as shown in FIG. 6.

Figure 8:
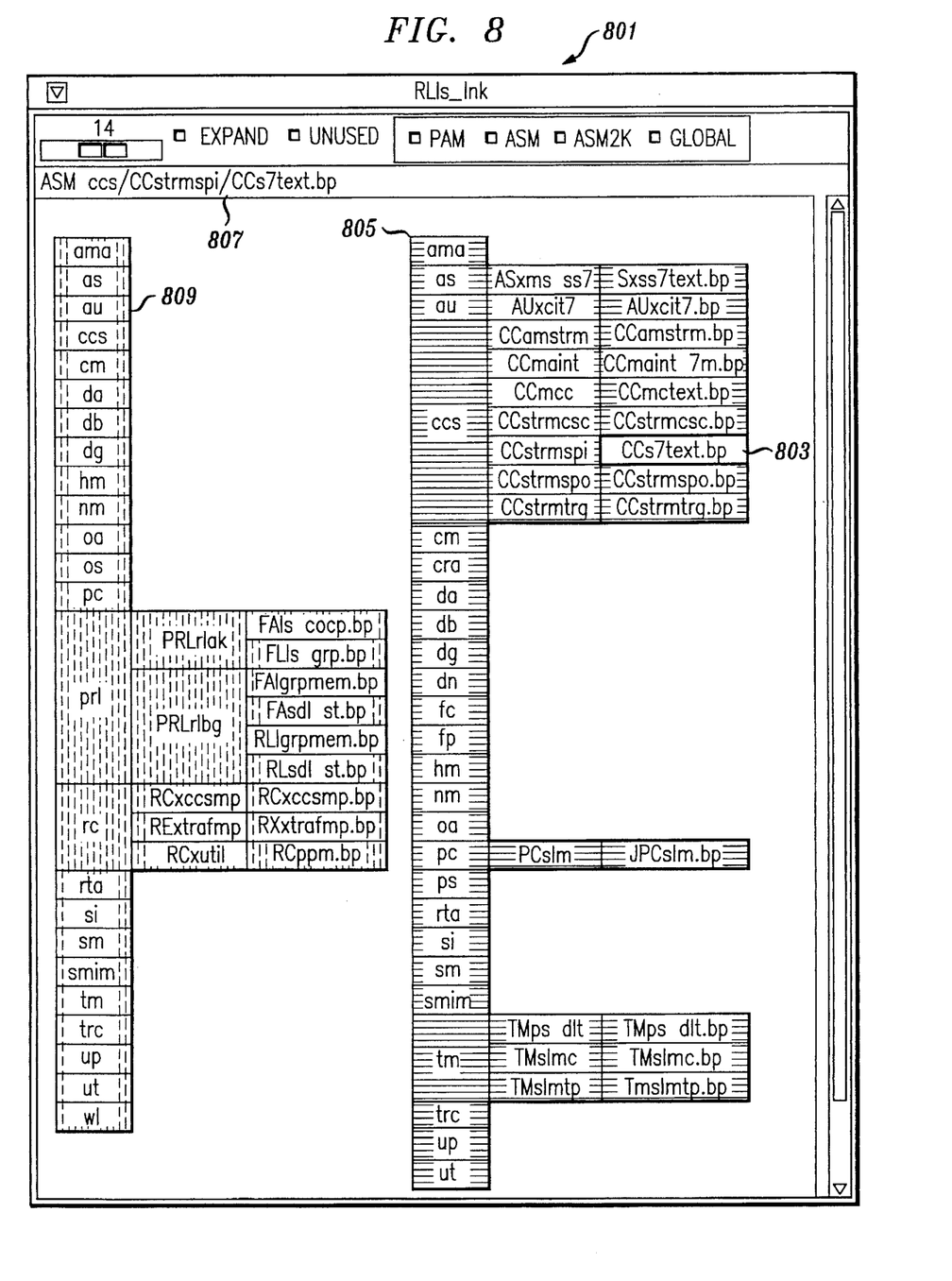
FIG. 8 is a representation of a typical code sub-tree display of a code view according to the present invention.

Referring now to FIG. 8, a display 801 is shown on display screen 105 that is called the code view. The code view displays the application source code of the RDBMS that uses the currently selected relation, in this case relation RLls_lnk. The application source code may be represented as a horizontal tree representing the code hierarchy. The subset or subsets of that horizontal code tree that use the currently selected relation are displayed in the code view.

The code view may be used by the user to find the application source code which references a relation and also to find where in the application source code the relation is accessed. The code view is linked to the over view such that all relations accessed from a unit of application code may be easily identified. Each unit of application code is represented by a box in the code view. Touching any code box with a cursor causes that box to be highlighted and its designation to be displayed. For example, code box 803 has been touched by a cursor (not shown) and is now highlighted by a contrasting color to the light blue of the rest of its code sub-tree 805, and its designation (CCs7text.bp) is shown in display area 807. Clicking the mouse button on a code box highlights in the over view all relations that use the corresponding unit of code.

If there are multiple applications that use the same relation, the result will be multiple code sub-trees in the code view, as sub-trees 805 and 809. For the purposes of the code view, application code executing on multiple separate processors in a distributed system is considered to be multiple separate applications, each of which may be examined as a separate code sub-tree.

Clicking the mouse button on a leaf of a code sub-tree opens a scrolling window which contains the text of the code with the text scrolled to a location in which the currently selected relation is accessed. Since a relation may be accessed multiple times by a unit of code, multiple locations are shown by using a location bar appearing on the right side of the scrolling window next to the scroll bar. Red or dark lines appearing in the location bar (not shown) indicate the multiple locations. Clicking on a box in the tree highlights all relations on the over view that are accessed by that code.

Figure 9:
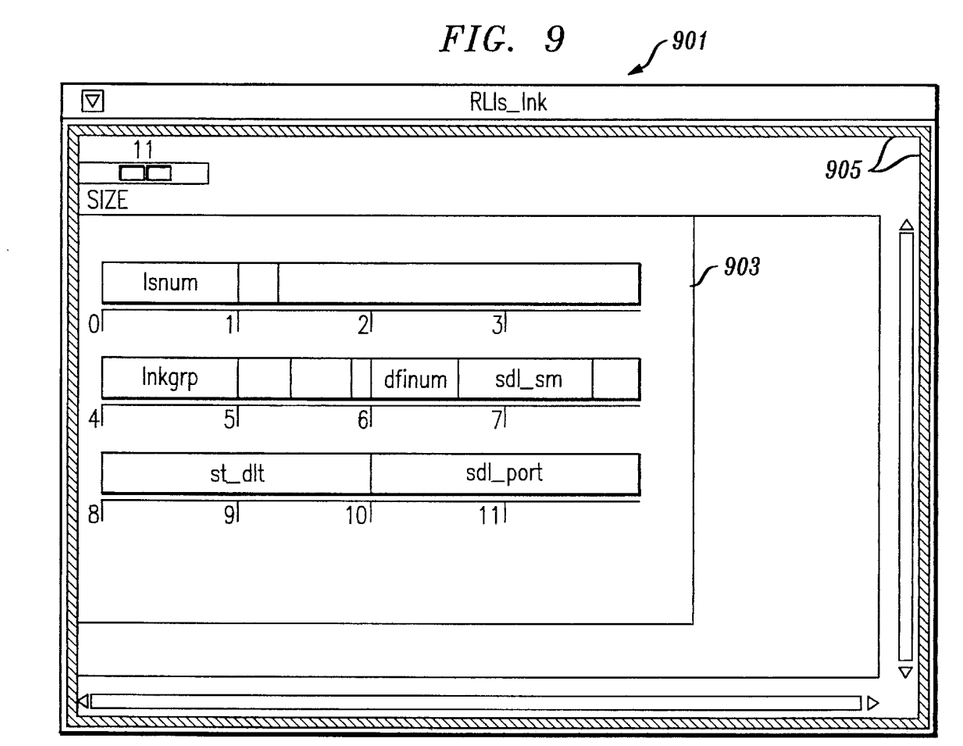
FIG. 9. is a representation of a typical display of a layout view according to the present invention.

Referring now to FIG. 9, a display 901 is shown in a window on display screen 105 that is called the layout view. The layout view shows the physical layout in memory of a tuple of a relation, as well as, the relative sizes of attributes of the relation. Display 901 shows a tuple 903 and attributes of the currently selected relation RLls_lnk. Attributes lsnum, lnkgrp, dfinum, sdl_sm, st_dlt, and sdl_port are represented by rectangles and the size of each rectangle is proportional to the size of its respective attribute. A frame 905 of this window is colored the same way that the selected relation to which it corresponds is colored or shaded in the other views, for the example of relation RLls_lnk, this highlight is cross hatch shaded, or alternatively in a colored version it would be colored dark green.

Figure 10:
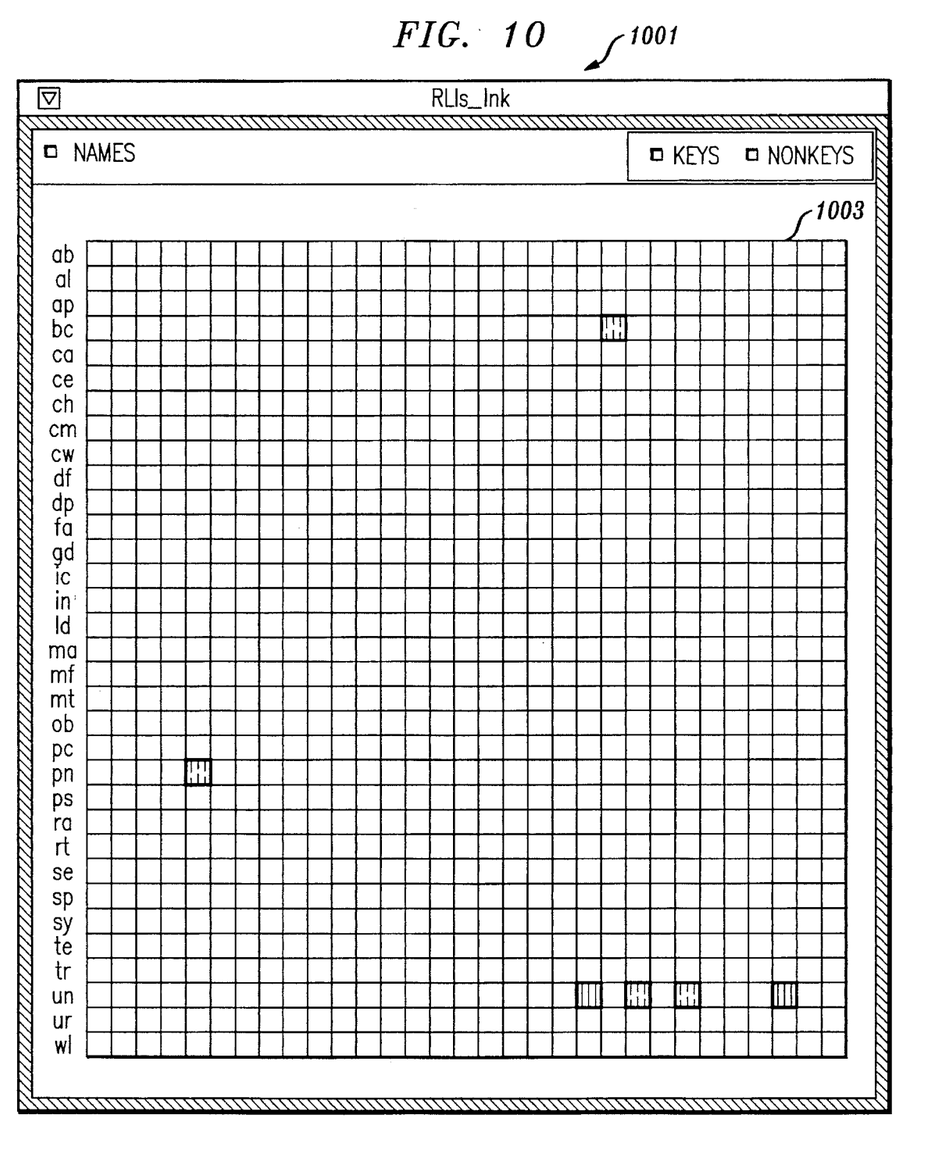
FIG. 10 is a representation of a typical display of a domain view according to the present invention.

Referring now to FIG. 10, a display 1001 is shown in a window on display screen 105 that is called the domain view. A domain is the set of all possible values belonging to an attribute. The domain view shows the domains that are used by a given relation and is useful to the user for exploring how domains are used and shared among relations. The domain view shows which domains are in the database. The domain view also shows which relations have a particular domain as either a key or a non-key. The use of a particular domain as a key in one relation and as a non-key in another relation implies a possible access path between those two relations based upon the domain that they have in common.

Display 1001 is a representative domain view with a grid 1003 of squares being its main feature. Each square of grid 1003 represents a domain. All of the domains that are defined for the database under analysis are listed in alphanumeric order. The domain view is linked to the over view for user navigation. Touching a relation in the over view with a cursor, for example relation RLls_lnk, causes all domains used by that relation to be highlighted in color. The non-key domains are colored with the same color as the current color of the selected relation bar in the over view, and the keys are colored with a different color than the non-keys in order to make them readily distinguishable. For the display 1001 shown in FIG. 10, relation RLls_lnk has bc22, pn5, un21, un23, un25, and un29 as domains. Of these, domains un 21 and un 29 are keys and domains bc22, pn5, un23, and un25 are non-keys. Window buttons labeled "keys" and "nonkeys" allow the user to limit the respective displaying of key domains only or non-key domains only. Touching a square in the domain view with a cursor causes a display of the domain and a short description in the domain view window. Clicking the mouse button on a square selects that domain for analysis causing relation bars of the relations that contain attributes using the selected domain to be displayed as highlighted in the over view window.

Figure 12:
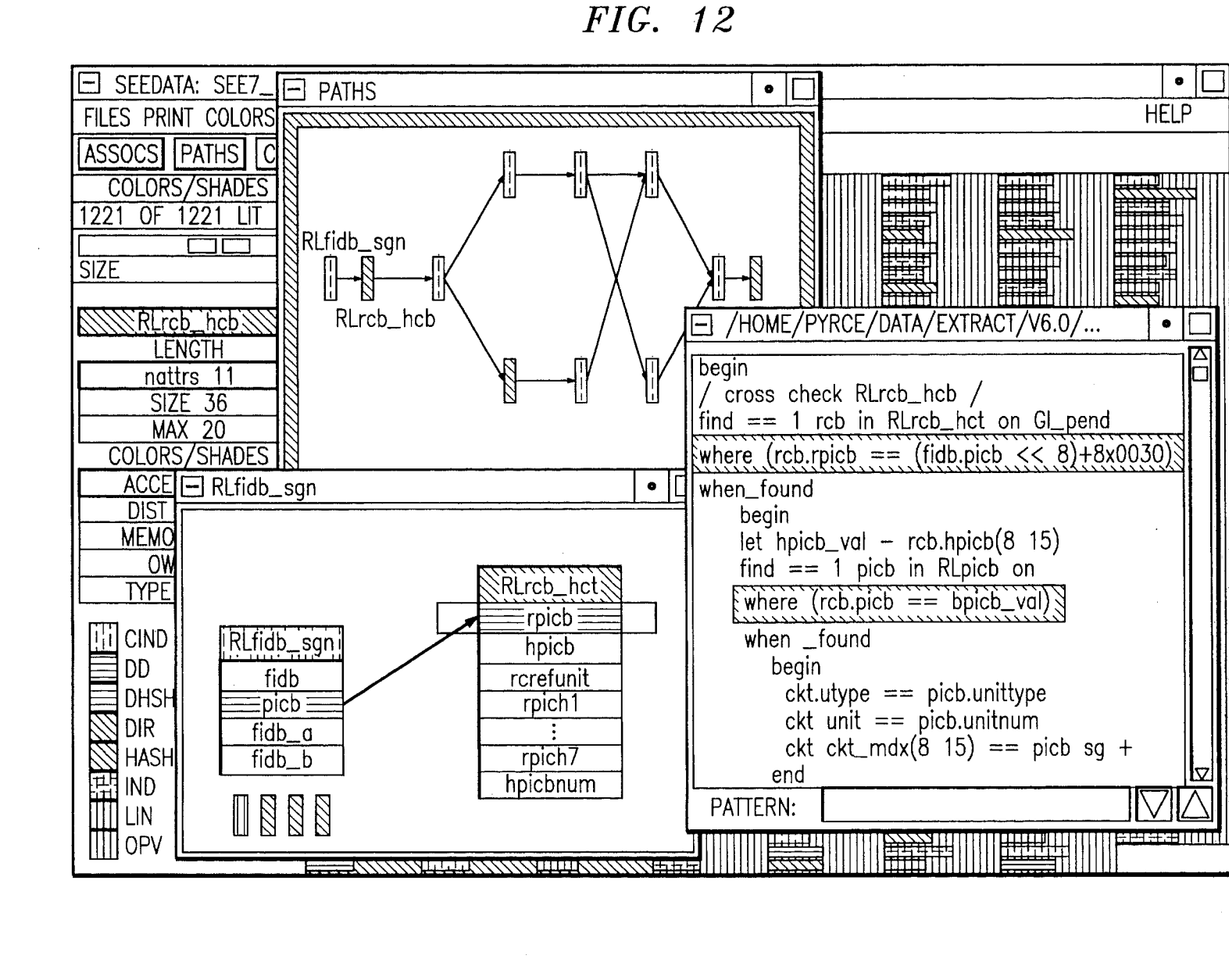
FIG. 12 is a representation of an over view display overlaid with a specification view, a path view, and an associations view.

Thus far, the over view, the specification view, the relations view, the path view, the code view, the layout view and the domain view have all been described. The specification view, the relations view, the path view, the code view, the layout view and the domain view have all been described as being linked to the over view. Further, since all of the views are windows, all or a sub set of the views may be displayed at any one time. For example, FIG. 12 shows an over view, a relations view, a path view and an expanded code view all displayed in partially overlapping windows on a display screen. Those views that are displayed together are linked such that cursor motion and selection in one view will have coordinated interactive results in the other open views. Moreover, the coloring or shading that appears in the over view is also linked, considering of course the exceptions noted in the description to distinguish important characteristics, to visually aid the user's analysis of the database.

The interactive visualization method and apparatus of the present invention provides an overall view of the entire relational database. The individual relations are categorized according to structural characteristics, such as number of attributes in a relation, number of tuples in a relation, number of bytes in a relations, access method to the relation, distribution of the relation in the database, software application that the relation is used by, logical entity that contains the relation, and the type of storage used for the relation. This is the initial structure shown. The characteristic may be explicitly defined or this may be an implicit relationship extracted by analysis tools specifically to find such relationships. The overall view is purely structural without semantic details to clutter it. If semantic details are desired, they are available in views called the specification view and the code view. If further structural details of a particular relation are desired, further details are available in the associations view, the path view, the code view and the domain view. The linking of the views makes them interactive with each other such that changes to one view causes corresponding changes in the other actively linked views. This not only speeds up analysis, but also gives the user a chance to analyze the effects of any changes, e.g. definition of a new object, on the relational database system.

To speed up the response of the computer system 101 to user inputs such as cursor touches or mouse button clicks, all the information that might be visually displayed is extracted from the database schema, database specifications and queries, and application source code before the visual analysis is begun. For any type of database, the associations could be extracted from the database query language with an A* version (A* is a combination of pattern matching that is based on AWK, and parsing that is based on YACC which allows AWK style pattern matching to be applied to grammar productions of a language specified with a YACC grammar) built for that language grammar. The associations are also preprocessed using FIT, a general-purpose, interpreted programming language that provides good facilitates for text processing and complex data structures. Paths are calculated from associations by a C program and the source code references to the relations are extracted from a Cscope database (Cscope is a well known code browser). The visual displays of the preprocessed information use Motif for windows. For non-UNIX systems equivalent software programs and tools would be necessary.

A source code listing of a program, which along with computer 101, provides the method and apparatus of the present invention is showed in the Microfiche Appendix.

Thus, it will now be understood that there has been disclosed a method and apparatus for displaying structures and characteristics of a large relational database. While the invention has been particularly illustrated and described with reference to preferred embodiments thereof, it will be understood by those skilled in the art that various changes in form, details, and applications may be made therein. For example, the invention was described as using preprocessed data to make the method more time responsive; however, real time processing could be used just as well and, depending on the real time processing power of the host system, the small delays ignored. Further, although the figures have used gray shading and cross hatching to visually indicate commonalities and distinctions, as indicated by the language of the Specification, the preferred visual indicators are colors of various shades and hues. Unfortunately, color computer displays are difficult to illustrate within current drawing regulations. It is accordingly intended that the appended claims shall cover all such changes in form, details and applications which do not depart from the true spirit and scope of the invention.

What is claimed is:

1. A method for displaying information about a relational database comprising the steps of:

identifying each relation of a plurality of relations in the relational database;

determining for each relation a respective number of occurrences of a specific data item contained therein;

determining for each relation a key structural characteristic which can be used to access that relation;

categorizing each relation of the plurality of relations according to key structural characteristics of the respective relation;

visually displaying the plurality of relations in categories according to the key structural characteristics thereof;

visually displaying for each relation of the plurality of relations a respective bar that is representative of the number of occurrences of the specific data item contained therein;

coloring each display of each relation that has the same key structural characteristic with a common color that is different from the coloring of the relations of the other key structural characteristics;

visually displaying a cursor that is operator controllable over the display area; and changing the coloring of a visual display of a relation with which the cursor is actively contacting to indicate a selection thereof for a display of further information.

2. The method as set forth in claim 1, further comprising the step of:

displaying an additional view in an active window displaying further information about the cursor-selected relation.

3. A method for displaying information about a relational database comprising the steps of:

identifying each relation of a plurality of relations in the relational database;

determining for each relation a respective number of a user selected data terms contained therein;

determining for each relation a key structural characteristic which can be used to access that relation;

sorting each relation of the plurality of relations according to key structural characteristics of the respective relation;

visually displaying in an over view the plurality of relations categorized according to the key structural characteristic thereof;

visually displaying in the over view for each relation of the plurality of relations a respective bar that is representative of the number of the user selected data item therein;

coloring in the over view each display of each relation that has the same key structural characteristic with a common color that is different from the coloring of the relations of the other key structural characteristics;

visually displaying in the over view a cursor that is operator controllable over the display area; and changing the coloring of a visual display of a relation with which the cursor is actively contacting to indicate a selection thereof for a display of further information in another view.

4. The method as set forth in claim 3, further comprising the step of:

displaying an additional view in an active window that displays further information about the cursor-selected relation.

5. The method as set forth in claim 4, further comprising the step of:

as the cursor selects a different relation in the over view, displaying in the additional view further information of the different relation in the active window.

6. The method as set forth in claim 3, further comprising the steps of:

displaying specification view having specifications of the selected relation from the specification of the large database in an active window.

7. The method as set forth in claim 3, further comprising the steps of:

displaying an associations view showing the selected relation and attributes of the selected relation in a center portion of an active window;

locating along a first side of the selected relation are one or more relations from which access to the selected relation can be provided;

locating along a second side opposite the first side are one or more relations to which access from the selected relation can be provided.

8. The method as set forth in claim 3, further comprising the steps of:

displaying an associations view showing the selected relation and attributes of the selected relation in a center portion of an active window;

locating along a first side of the selected relation are one or more relations from which access to the selected relation can be provided;

locating along a second side opposite the first side are one or more relations to which access from the selected relation can be provided; and locating along a top edge are one or more relations that can provide both access to and access from the selected relation.

9. The method as set forth in claim 3, further comprising the step of:

displaying a code tree view showing a subtree of a source code tree that accesses the selected relation in an active window.

10. The method as set forth in claim 3, further comprising the step of:

displaying a memory layout view showing a memory layout of the selected relation and attributes of the selected relation in an active window.

11. The method as set forth in claim 3, further comprising the steps of:

displaying a domain view showing all defined domains of all of the attributes of the database in an active window; and highlighting each domain of the attributes of the selected relation in a different color than the other domains.

12. The method as set forth in claim 3, further comprising the steps of:

displaying a path view showing the selected relation in an active window;

selecting a second selected relation;

showing the second relation in the path view active window;

locating the selected relations opposite one another; and displaying a shortest access paths between the selected relations.

13. The method as set forth in claim 12, further comprising the step of:

matching the colors of a frame of the active path view active window with the colors of the first and second selected relations in the over view.

14. The method as set forth in claim 13, further comprising the step of:

matching the colors of a frame of the active path view active window with the colors outlining boxes representing the first and second selected relations in the path view.

15. Apparatus comprising:

a large database having at least one thousand relations, each relation having a set of structural characteristics;

each set of structural characteristics having a key structural characteristic that is used to access a respective relation of said each set of structural characteristics;

means for visually displaying a plurality of views, each view appearing in an active window that can be sized from covering a fraction of the display area to covering the entire display area or turned off;

means for counting a number of occurrences of a user selected data item for each relation; and means for visually displaying the plurality of relations, each relation of the plurality of relations is categorized according to at least one respective key structural characteristic of the respective relation in a first view and represented by a bar having a length that represents the number of occurrences of the user selected data item in the relation.

* * * * *